United States Patent
Holl et al.

(10) Patent No.: US 7,438,553 B2
(45) Date of Patent: Oct. 21, 2008

(54) MOLD CLOSING DEVICE FOR INJECTION MOLDING MACHINES

(75) Inventors: Horst-Jürgen Holl, Neustadt-Wied (DE); Heinz Klein, Rossbach (DE); Werner Wagner, Kurtscheid (DE); Alfred Schiffer, Obersteinebach (DE)

(73) Assignee: Dr. Boy GmbH & Co. KG, Neustadt-Fernthal (DE)

( * ) Notice: Subject to any disclaimer, the term of this patent is extended or adjusted under 35 U.S.C. 154(b) by 156 days.

(21) Appl. No.: 11/429,791

(22) Filed: May 8, 2006

(65) Prior Publication Data
US 2007/0218163 A1      Sep. 20, 2007

(30) Foreign Application Priority Data
Mar. 17, 2006    (DE) .................. 10 2006 012 381

(51) Int. Cl.
*B29C 45/68* (2006.01)
(52) U.S. Cl. .................. 425/589; 425/590; 425/595
(58) Field of Classification Search .............. 425/589, 425/590, 595

See application file for complete search history.

(56) References Cited

U.S. PATENT DOCUMENTS

| | | | | |
|---|---|---|---|---|
| 4,605,367 A * | 8/1986 | Gutjahr | ...................... | 425/590 |
| 4,984,980 A * | 1/1991 | Ueno | ......................... | 425/595 |
| 5,261,810 A * | 11/1993 | Kamp et al. | .................. | 425/590 |
| 5,338,174 A * | 8/1994 | Miese et al. | ................. | 425/589 |
| 5,750,163 A | 5/1998 | Klein et al. | .................. | 425/590 |
| 5,773,050 A * | 6/1998 | Wohlrab | ...................... | 425/589 |
| 6,537,057 B2 * | 3/2003 | Tamaki et al. | ................ | 425/590 |
| 6,851,942 B2 * | 2/2005 | Wohlrab | ...................... | 425/589 |
| 6,877,977 B2 * | 4/2005 | Wohlrab | ...................... | 425/589 |

* cited by examiner

*Primary Examiner*—James Mackey

(57) ABSTRACT

A mold closing device for injection molding machines, especially injection molding machines for plastic material, comprises two mold closing plates (10, 12) movable relative to each other. A displacing means (22) with an electromotive drive (26) is provided for opening and closing the mold closing plates (10, 12). According to the invention, the electromotive displacing means (22) that allows for a quick and positionally accurate opening and closing, is connected to a hydraulic holding means (24) for generating a holding force.

6 Claims, 3 Drawing Sheets

MOLD CLOSING DEVICE FOR INJECTION MOLDING MACHINES

BACKGROUND OF THE INVENTION

1. Field of the Invention

The invention is directed to a mold closing device for injection molding machines, especially for injection molding machines for plastic material.

2. Description of Related Art

Injection molding machines, which are used especially to manufacture plastic parts, comprise mold closing plates that are movable relative to each other. The mold closing plates each support one half of an injection molding tool, the mold closing plates being moved towards each other to close the tool. After at least one of the two mold closing plates has been displaced by means of a displacing means, it is necessary to apply a closing force on the two mold closing plates, and thus on the two tool parts, by means of a holding means so as to prevent the two tool parts from being pressed apart when injecting the injection molding mass.

Generally, closing units with two or three plates are known. In three-plate closing units, two outer stationary mold closing plates are provided. A displaceable mold closing plate, the so-called closing plate, is provided between these two mold closing plates, which closing plate is supported with respect to one of the stationary mold closing plates and is moved towards the second stationary mold closing plate, the so-called faceplate, to close the device. The two mold closing plates that are moved towards each other when closing the device, carry the injection molding tools. With two-plate closing units, a stationary faceplate and a movable closing plate are usually provided. The device is closed by pulling the closing plate towards the stationary faceplate. On the injection side, the displacing means is arranged in a superposed or nested manner with respect to the injection unit. Therefore, two-plate closing units have a shorter structural length.

In three-plate closing units, toggle levers are known for closing the mold closing device. Using the toggle levers, the movable mold closing plate is moved first and, thereafter, a corresponding closing force is applied by the toggle lever. However, such mold closing devices are disadvantageous in that an exact displacement of the movable mold closing plate is difficult, especially during final positioning. Further, the toggle lever may be pushed too far. This results in the closing force possibly not being clearly defined. This may impair the quality of the injection molded parts. Therefore, such mold closing devices have an increased tool wear. Moreover, the bars may be overstressed.

Further, hydraulic closing units are known, wherein both the displacement of the closing plate and the application of the closing force are effected through a hydraulic displacing and holding means. To this effect, the closing means have corresponding hydraulic cylinders with pistons guided therein. Such hydraulic systems usually have at least one differential cylinder that is pressurized. Thus, it is possible to perform an approaching movement such as the closing of the mold closing device. Through a connectable further linear hydraulic cylinder, a slow opening of the closing device can be achieved by a reversal of the area ratios. Here, the closing force is achieved through a cylinder with a relatively large diameter to which high pressure can be supplied. To do so, a hydraulic pressure transmission unit can be employed that serves both as a closing valve and as a hydraulic pressure transmitting element. Such a pressure transmission unit is described, for example, in U.S. Pat. No. 5,750,163. Positioning the movable closing plate exactly is technically complex.

SUMMARY OF THE INVENTION

It is an object of the present invention to provide a mold closing device for injection molding machines, especially for machines for injection molding with plastic material, wherein the positioning is more precise while, at the same time, the efficiency is enhanced.

The mold closing device of the present invention comprises two mold closing plates movable relative to each other. Preferably, the mold closing device of the present invention is a two-plate closing unit with a stationary plate or faceplate and a movable plate or closing plate. Further, a displacing means with an electromotive drive is provided for opening and closing the closing plates. Preferably, the electromotor-driven displacing means is used to displace the movable closing plate relative to the stationary faceplate. According to the invention, a holding means is provided besides the electromotor-driven displacing means, which generates the shutting or closing force applied on the mold closing plates or the tools connected with the mold closing plates. Preferably, the holding means is operated hydraulically. Thus, according to the invention, an electromotor-driven displacing means is combined with a hydraulically operated holding means. This offers the advantage that an exact and fast displacement of the mold closing plates relative to each other is possible using the electromotive drive, wherein, preferably, only the closing plate is displaced. The combination with a hydraulic holding means allows to apply a high shutting or closing force after the mold has been closed. Such high forces can be generated better and more effectively with hydraulic means than with electromotor-driven means. The present combination of an electromotor-driven displacing means and a hydraulic holding means combines the advantages of an electric drive with those of a hydraulic closing mechanism. The present combination of an electromotive displacing means with a hydraulic holding means thus offers the advantage of high precision and little wear.

By means of the present combination of the electromotive drive and the hydraulic holding means, it is possible to thereby realize an exact displacement of the mold closing plates at different speeds upon opening and closing the same. Further, a high holding or closing force can be generated by the hydraulic holding means, without the need for a toggle lever. This force can be adjusted accurately by means of the hydraulic holding means. The disadvantages of a toggle lever, especially the disadvantage that the closing force cannot be accurately adjusted with a toggle lever, will not arise if a hydraulic holding means is provided.

Preferably, the electromotive drive is a linear drive. In particular, the electromotive drive is a spindle drive. A nut of the spindle drive is connected with the electromotive drive, e.g. through belts and/or gears. Rotating the spindle nut will displace the spindle linearly. Thus, a rotational movement of the spindle nut is transformed into a linear displacement of the spindle. By providing a corresponding transmission or reduction ratio, as well as a corresponding adaptation of the spindle pitch, an extremely accurate linear movement can be achieved. In particular, it is possible, for example when closing the mold closing plates, to first move the movable mold closing plate quickly and to reduce the speed just before the tools touch. Moreover, it is possible to open the tools slowly.

In a particularly preferred embodiment, the spindle is connected with a piston rod and/or is formed as a piston rod. The piston rod may be connected with the movable mold closing plate either directly or through a guide bar. Preferably, the piston rod connected with the spindle is disposed in a pressure cylinder. In this case, the pressure cylinder is connected with the holding means. A fluid, such as a hydraulic fluid or the like, is provided in the pressure cylinder. After the displacement of the mold closing plate with the help of the displacing means, i.e. by operating the spindle drive, the pressure cylinder can thus be pressurized so that the closing force is transmitted through the piston rod onto the mold closing plate and from there to the tool. In this context, it is particularly advantageous that the piston rod performs a dual function, i.e. it is connected to the spindle of the spindle drive to perform displacement, on the one hand, and, by being arranged in the pressure cylinder as a hydraulic means, it can be pressurized to build up the shutting or closing force, on the other hand.

To generate the shutting or closing force, the holding means preferably comprises a pump means. The pump means preferably is a pressure transmission unit with a hydraulic drive or a linear pump. Since a plurality of closing cylinders are preferably provided, it is especially preferred to connect them to a single pump means through a common supply line. This guarantees that the same force is exerted on all closing cylinders. Thus, all piston/cylinder systems transmit the same force.

In a particularly preferred embodiment of the present mold closing device, a plurality of piston rods are arranged between the mold closing plates. The piston rods are rigidly connected with one mold closing plate, preferably the movable mold closing plate. At the other mold closing plate, preferably the stationary faceplate, the piston rods are supported displaceably. Preferably, four piston rods are provided. Preferably a part of the piston rods is connected to a spindle or a spindle drive. In particular, two piston rods which, preferably, are arranged diametrically opposite each other are each connected with a spindle drive. This prevents a tilting of the tool connected to the closing plate. Thus, the two injection molding tool halves are always oriented in parallel with each other.

Preferably, the pressure cylinders are in fluid communication with at least one receiving chamber. When the mold closing device is opened, the fluid is thus pressed into the receiving chambers. Preferably, when closing the mold closing device, the fluid is supplied from the at least one receiving chamber to the pressure cylinders already during the displacement of the closing plate and is then pressurized with high pressure by the pump means to generate the shutting or closing force. This has the advantage that no additional container for holding fluid is required. Further, it is advantageous to supply the fluid into the pressure cylinders already when the movable mold closing plate is displaced so that the shutting or closing force can be generated through the pump means immediately after the closing of the mold closing device.

In order to supply fluid from the at least one receiving chamber into the pressure cylinders in a simple manner while the closing plate is displaced using the electromotive drive, especially the spindle drive, a piston is preferably provided within the receiving chamber. In a particularly preferred embodiment, this piston is connected with the spindle. Moving the spindle to close the mold closing device thus automatically causes a displacement of the piston arranged in the receiving chamber. Thereby, the fluid in the receiving chamber is supplied into the pressure cylinders. In this embodiment, the pump means is substantially required only to generate the shutting or closing force. As for the rest, the pump means may serve to compensate for losses.

Preferably, the pressure pistons or the spindle pistons connected to the piston rods are configured such that the pistons define both the fluid chamber of the pressure cylinders and the fluid chamber of the receiving chamber. Thus, the pistons have a dual function, with fluid being present on both sides of the pistons. For one, this is the fluid present in the pressure cylinders and, on the other hand, this is the fluid present in the receiving chambers. In this case, a plurality of receiving chambers is provided preferably. In particular, at least each pressure piston is also connected to a receiving chamber or serves both as a pressure piston and as a receiving chamber piston. In another preferred embodiment, the spindle of the spindle drive is arranged in the receiving chamber. The spindle of the spindle drive and the bearings of the spindle are thus always lubricated and therefore maintenance-free.

According to the invention, after the mold closing device has been closed by means of the electromotor-driven displacing means, the shutting or closing force is applied by means of the hydraulic closing means. In the preferred embodiment, in which the piston rod is connected with the spindle of the spindle drive and is arranged in a pressure cylinder, a part of the shutting or closing force would act on the spindle drive. To avoid a possible occurrence of damages caused thereby, a preferred embodiment of the invention is provided with a control means for causing a hunting of the electromotive drive. Especially, it is also possible to entirely avoid the effect of the shutting or closing force on the spindle drive by means of an appropriate control. In this instance, it is possible, for example, to avoid the occurrence of forces by actively rotating the spindle nut. Similarly, the spindle drive could be switched to idle, e.g. by providing a clutch, so that the spindle can rotate freely. As a consequence, the force exerted by the hydraulic holding means does not act on the spindle drive or on another form of electromotive drive.

The combination of an electromotive drive as the displacing means with a hydraulic holding means, as provided by the present invention, allows for higher opening and/or closing speeds of the closing device. This results in shorter cycles. The forces occurring during the opening and closing of the mold closing device are substantially the same because of the provision of an electromotive drive. Besides the higher positioning accuracy achieved by an electromotive drive, especially a spindle drive, it is further possible to obtain a saving of energy and a reduction of noises. Moreover, the present mold closing device can likewise be realized as a vertical or a horizontal structure.

BRIEF DESCRIPTION OF THE DRAWINGS

The following is a detailed description of a preferred embodiment of the present invention with reference to the accompanying drawings.

In the Figures.

DETAILED DESCRIPTION OF THE PREFERRED EMBODIMENT OF THE INVENTION

Figure 1:
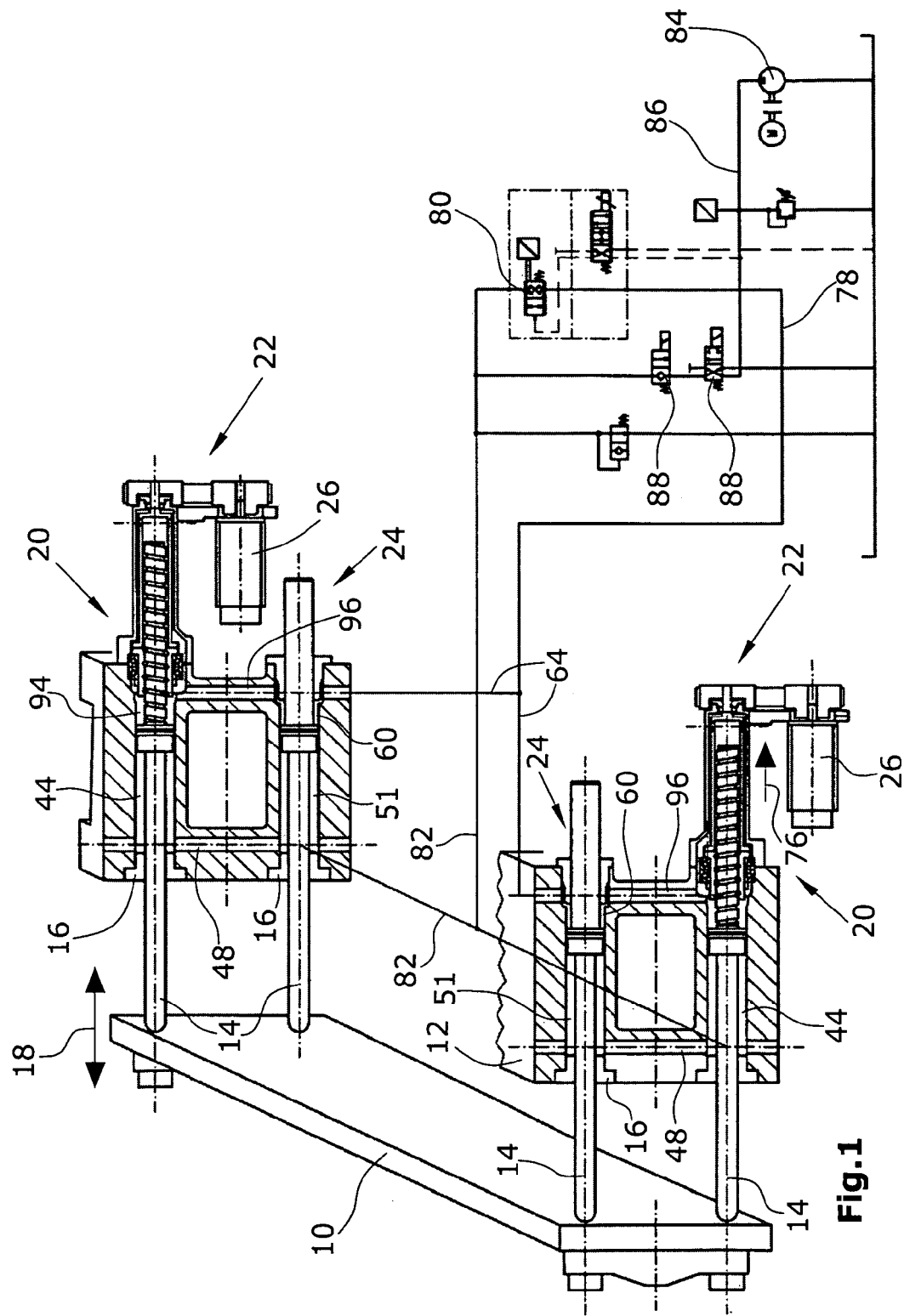
FIG. 1 is a schematic, much simplified, perspective, partly cut view of a preferred embodiment of the mold closing device.

In a preferred embodiment of the invention, a mobile closing plate 10 is provided. Further, the stationary faceplate 12 is indicated. The closing plate is rigidly connected with four piston rods 14. Bearing bushings 16 support the piston rods 14 for displacement in the direction of the arrow 18.

Two of the piston rods 14 are connected with spindle drives 20 of the displacing means 22. The other two piston rods 14 are connected with piston/cylinder units 24 of the hydraulic holding means.

Figure 2:
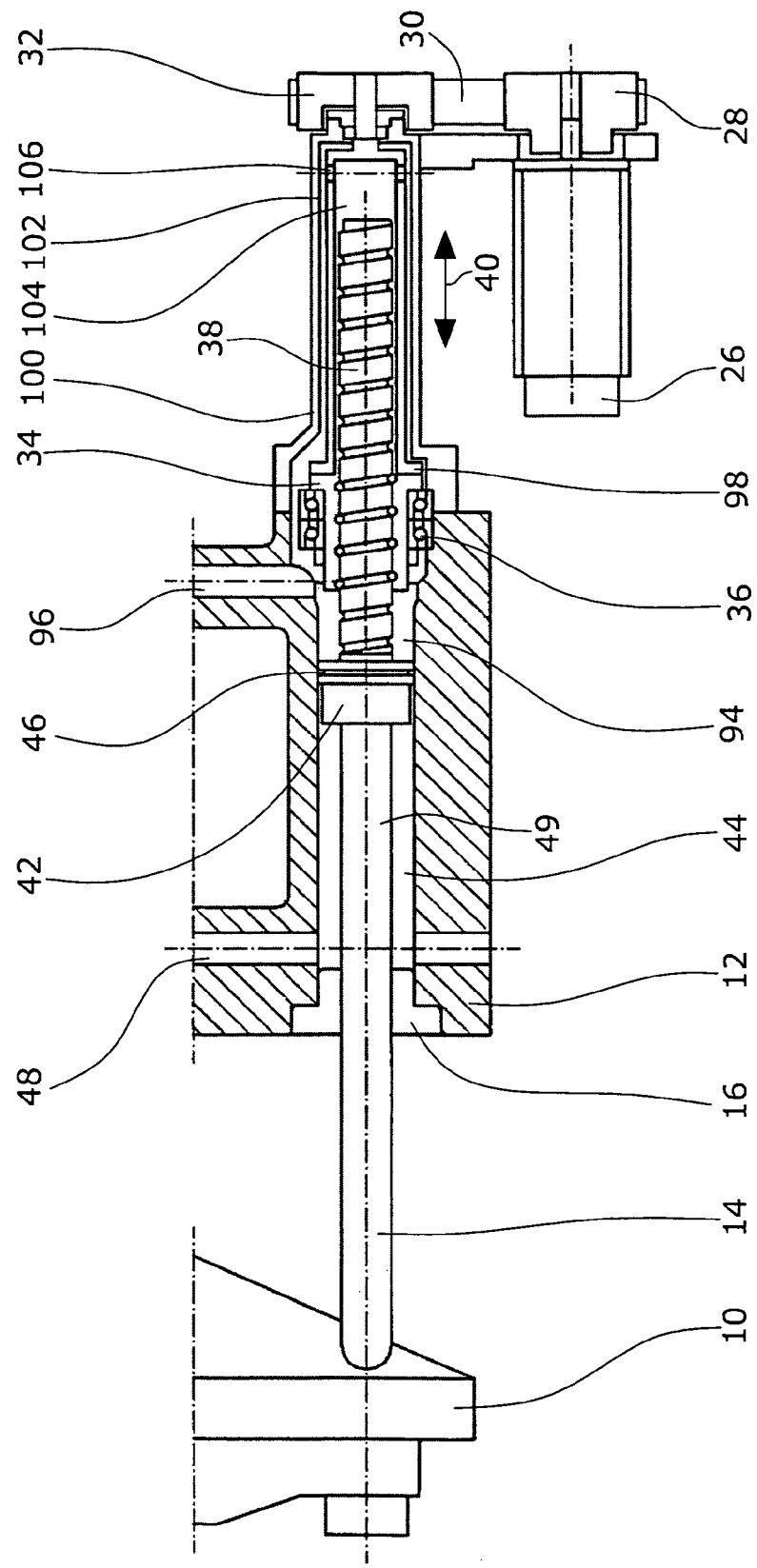
FIG. 2 is a schematic enlarged illustration of the displacing means used in the embodiment.

The displacing means 22 (FIG. 2) has a spindle drive 20 driven by an electric motor 26. To this avail, a gear 28 of the electric motor 26 is connected with a gear 32 via a toothed belt 30. the gear 32 is fixedly connected with a spindle nut 34. The spindle nut 34 is rotatably supported in the faceplate 12 by means of ball bearings 36. In the preferred embodiment, the spindle drive 20 is a recirculating ball screw. The spindle nut 34 surrounds the spindle 38. By rotating the spindle nut 34 by means of the electric motor 26, the spindle 38 is moved in the direction of the arrow 40.

In the embodiment illustrated, the sealing ring 46 seals a piston chamber 44, which is connected with channels 48, and a piston chamber 94 provided on the side of the spindle 38. The piston chamber 94 is connected with the piston chamber 60 of the holding means 24 through a channel 96. On the side of the piston 42 averted from the mobile mold closing plate, a second piston chamber 94 is provided from which, when the mold closing device is closed, fluid is pressed through the channels 96, 64 and 78 via the valve 80 into the channels 82 and from these into the chambers 44 and 51. The fluid present in the piston chamber 94 flows around both the bearings 36 and the spindle 38, so that the bearings 36, the spindle 38 and the spindle nut 34 are always sufficiently lubricated.

To allow for the lubrication of the entire spindle 38, the spindle nut 34 is connected to a hollow shaft 98 that encloses the spindle 38 cylindrically and is connected with the gear 32. The stationary faceplate 12 serving as the housing is surrounded by a substantially cylindrical housing stub 100 in the region of the spindle 38, which encloses the hollow shaft 98. An annular gap 102 is formed between the housing stub 100 and the hollow shaft 98, through which fluid can flow. To allow fluid to flow into the interior 104 of the hollow shaft 98, the hollow shaft 98 has transverse bores 106. Thus, the interior 104 is in fluid communication with the piston chamber 94. The volumes of the interiors 104 and the piston chambers 94 are the same as the volumes of the piston chambers 44 and 51.

The spindle piston 42 is connected with the piston rod 14 via a piston rod 49 arranged in the pressure cylinder 44. The piston rod 49 is preferably integral with the piston rod 14.

Figure 3:
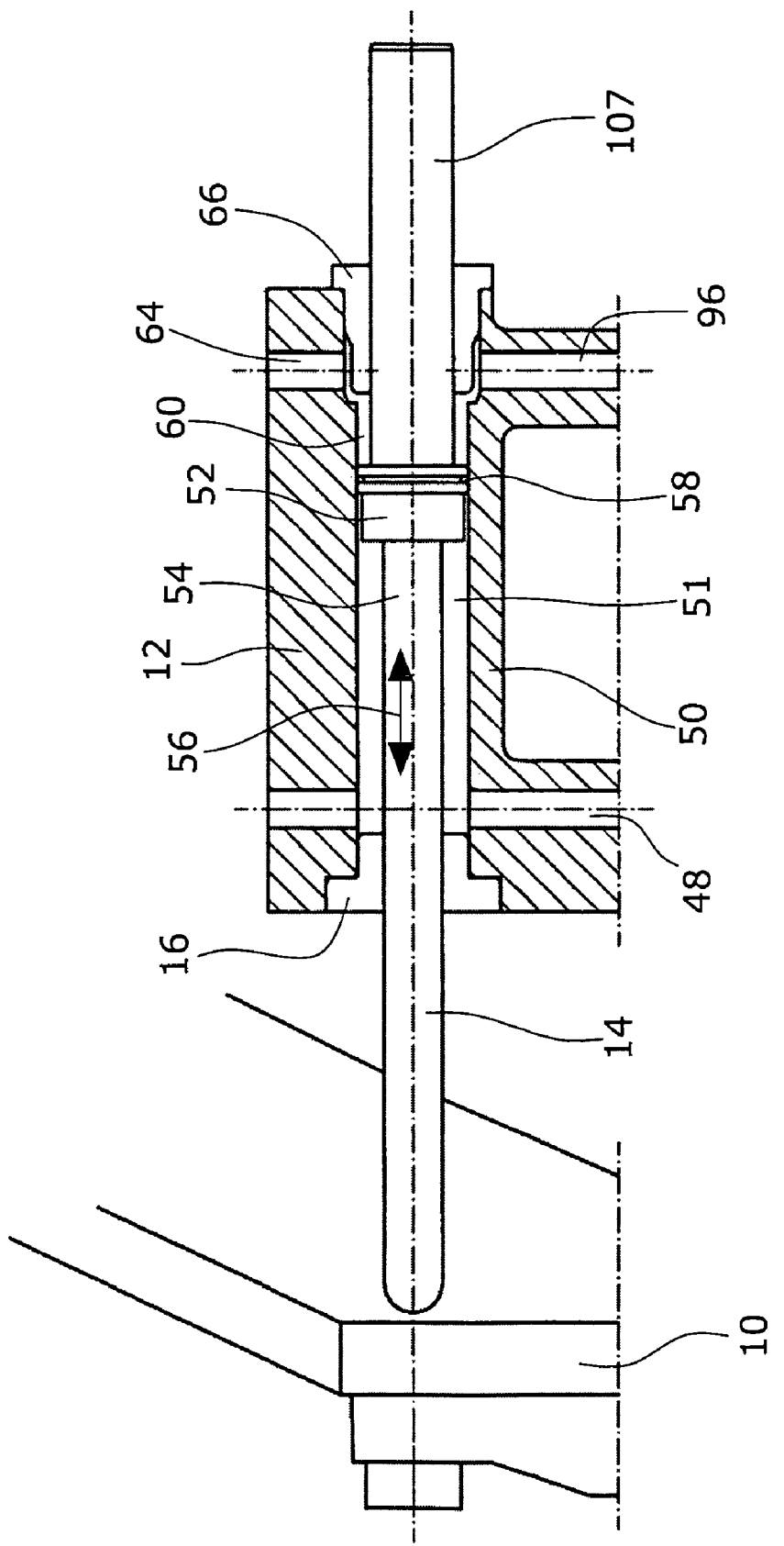
FIG. 3 is a schematic enlarged illustration of a part of the closing means used in the embodiment.

The piston/cylinder unit 24 (FIG. 3) of the holding means comprises a pressure piston 52 disposed in a pressure cylinder 50. The pressure piston 52 is connected with the piston rod 14 via a piston rod 54, the piston rod 54 and the piston rod 14 preferably being integral. The pressure cylinder 50 forms a piston chamber 51 filled with hydraulic fluid and also connected with the channel 48. The piston 52 is displaceable in the pressure cylinder 50 in the direction indicated by the arrow 56.

The piston 52 defines the piston chamber 51 of the pressure cylinder 50. To this effect, a seal 58 is provided. Further, the piston 52 defines another piston chamber 60. The piston chamber 60 is connected with the channel 64 and is closed by a bearing cover 66 provided in the faceplate 12.

A piston rod 107 connected with the piston 52 is surrounded by the seal ring 58. Thus a piston chamber 60 is provided between the sealing ring 58 and the piston 52 that is connected with-the piston chamber 94 via a channel 96 and with the channel 64.

When closing the mold closing device, fluid is supplied from the piston chambers 60 and 94 through the channels 96, 64, 78 and the valve 80 into the lines 82. The fluid is supplied further through the channels 48 into the piston chambers 44 and 51. Through the transverse bore 106 and the annular gap 102, the fluid is conveyed by the spindle 38 from the interior 104 into the piston chambers 44 and 51 via the lines 64 and 82. After both mold closing plates 10, 12 have been closed, the valve 80 is closed, and fluid is pumped by the pump means 84 through the channel 86 in to the channels 82 via the valves 88 and further into the piston chambers 44, 51 to apply the required closing force. To avoid damage to or a jamming of the spindle drive 20, the spindle drive 20 may be controlled through a control means (not illustrated) such that a hunting of the spindle nut 34 is effected. To open the closing device, the spindles 38 are moved in opposite directions and the valve 80 is opened. Thus, the fluid can flow from the piston chambers 44, 51 into the piston chambers 60, 94 and 104.

Since the pump means 84 is operated once in each cycle, possible losses caused thereby can be compensated.

Although the invention has been described and illustrated with reference to specific embodiments thereof, it is not intended that the invention be limited to those illustrative embodiments. Those skilled in that art will recognize that variations and modifications can be made without departing from the true scope of the invention as defined by the claims that follow. It is therefore intended to include within the invention all such variations and modifications as fall within the scope of the appended claims and equivalents thereof.

What is claimed is:

1. A mold closing device for injection molding machines for plastic material, comprising:
   two mold closing plates movable relative to each other,
   an electromotive drive for closing the mold closing plates, the electromotive drive including a spindle drive, a spindle nut connected with said spindle drive a spindle of said spindle drive being connected with one of the movable mold closing plates through a piston rod, the spindle, the piston rod, and said one movable mold closing plate forming a unitary structure being not movable relative to each other such that the spindle, the piston rod, and the one of the mold closing plates can only be moved together; and
   a hydraulic holding system for generating a holding force acting on the mold closing plates to hold the mold closing plates in a close postion.

2. The mold closing device of claim 1, wherein said piston rod is arranged in a pressure cylinder which is in fluid communication with said hydraulic holding system.

3. The mold closing device of claim 1, wherein said hydraulic holding system includes a pump or a pressure tranmission or a linear pump to generate a mold closing plate shutting force.

4. The mold closing device of claim 1, wherein a plurality of piston rods are fixedly connected with one mold closing plate and being displaceably supported in the other mold closing plate.

5. The mold closing device of claim 1, further including pressure pistons independent of said electromotive drive and arranged in pressure cylinders, said pressure cylinders being in fluid communication with a pump.

6. The mold closing device of claim 1, wherein said spindle is disposed in one of plurality of receiving chambers.

* * * * *